United States Patent [19]
Reeves

[11] Patent Number: 5,368,426
[45] Date of Patent: Nov. 29, 1994

[54] CONNECTOR AND METHOD FOR EDGE-TO-EDGE ASSEMBLY OF PRESSBOARD TO FORM FURNITURE STRUCTURES

[75] Inventor: David W. Reeves, Aloha, Oreg.

[73] Assignee: Thrustmaster, Inc., Tigard, Oreg.

[21] Appl. No.: 72,172

[22] Filed: Jun. 4, 1993

Related U.S. Application Data

[63] Continuation-in-part of Ser. No. 3,926, Jan. 21, 1993, Pat. No. Des. 345,580.

[51] Int. Cl.[5] .................... F16B 37/00; F16B 7/08; B25G 3/00
[52] U.S. Cl. ................... 411/104; 411/427; 403/205; 403/231
[58] Field of Search ............. 411/104, 427, 432; 403/205, 231; 29/525.1

[56] References Cited

U.S. PATENT DOCUMENTS

| | | | |
|---|---|---|---|
| 3,106,994 | 10/1963 | Scott | 403/231 |
| 3,527,280 | 9/1970 | MacNorius | 411/104 |
| 3,970,399 | 7/1976 | Palumbo | 403/231 |
| 4,740,098 | 4/1988 | Witt | 403/205 |

OTHER PUBLICATIONS

Jul. 1992 Catalog, pp. 3; 12; Hafele GmbH & Co., Nagold.

*Primary Examiner*—Neill R. Wilson
*Attorney, Agent, or Firm*—Marger, Johnson, McCollom & Stolowitz

[57] ABSTRACT

A connector having a horizontal channel member and a vertical channel member connected to the horizontal channel member. The vertical member has a lengthwise hole formed therein for receiving a screw. The vertical channel member is connected at a midpoint of the horizontal channel member such that the vertical channel member and the horizontal channel member form a T-shape protrusion. The vertical and the horizontal channel member are attached to a backplate which circumscribes the members. The connector is inserting into a T-shaped channel in a perimeter edge of a second sheet of composite material. A hole formed in a first sheet is positioned over the hole in the connector and a screw is driven into both holes firmly attaching the first sheet to the second sheet.

9 Claims, 3 Drawing Sheets

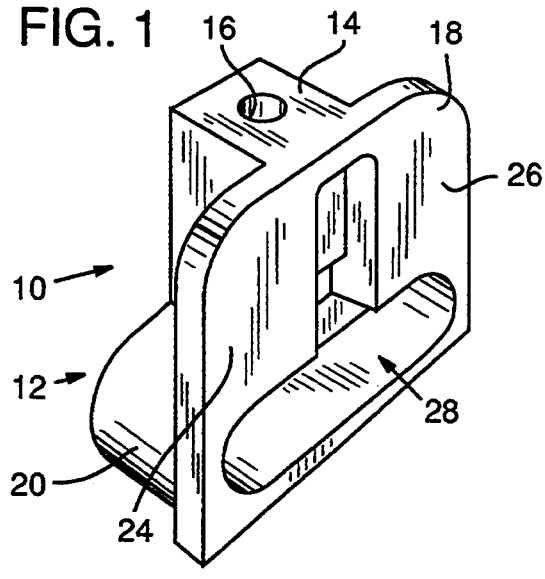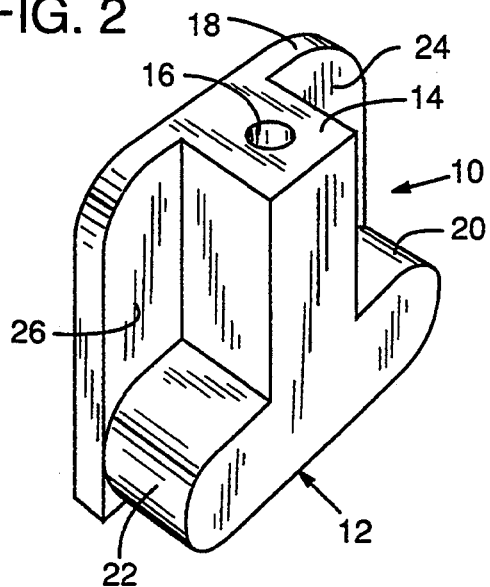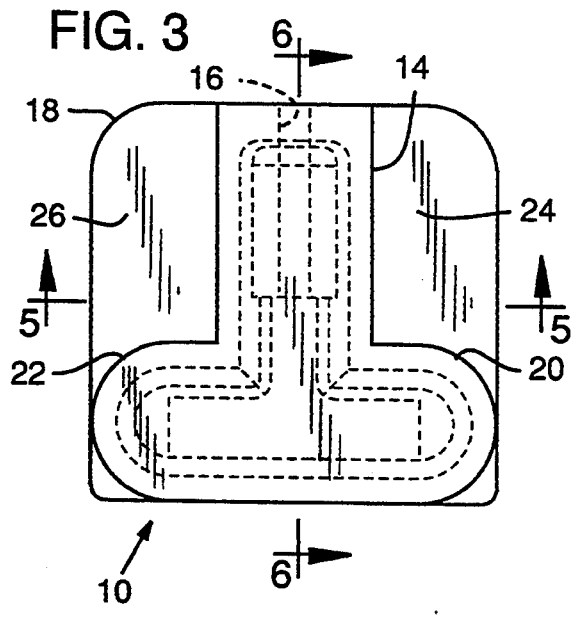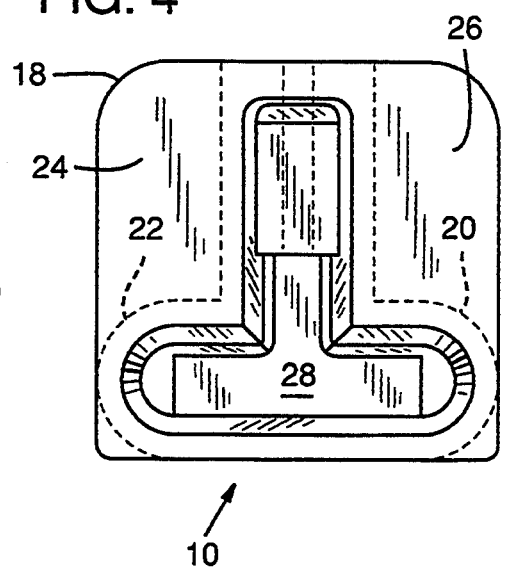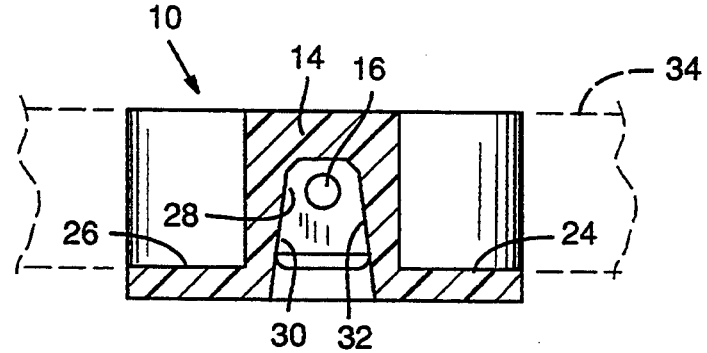

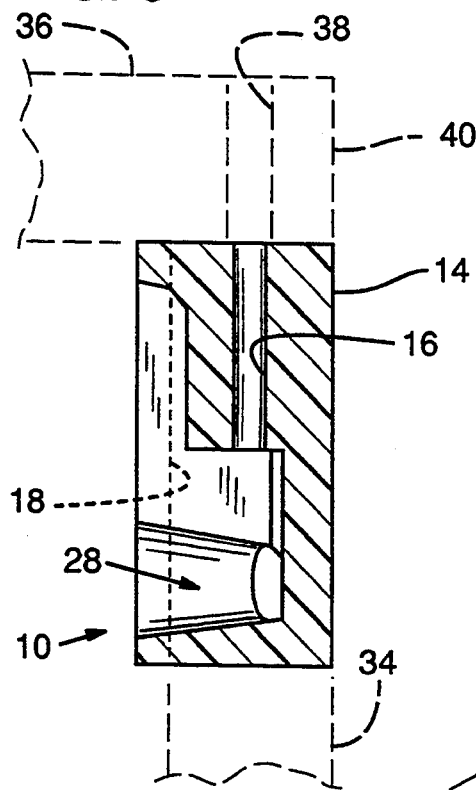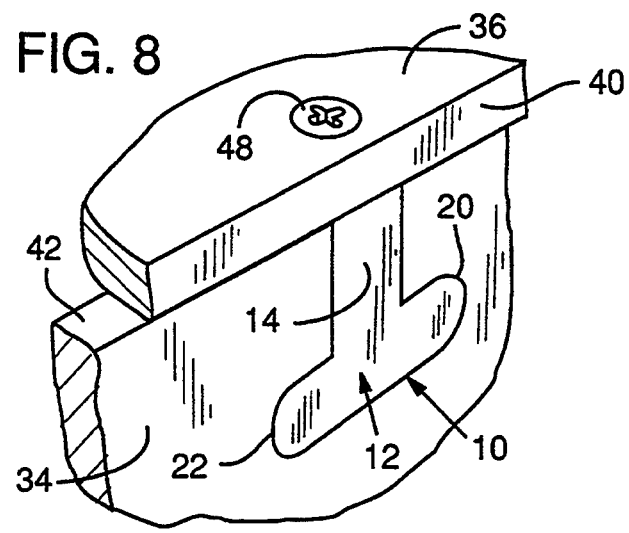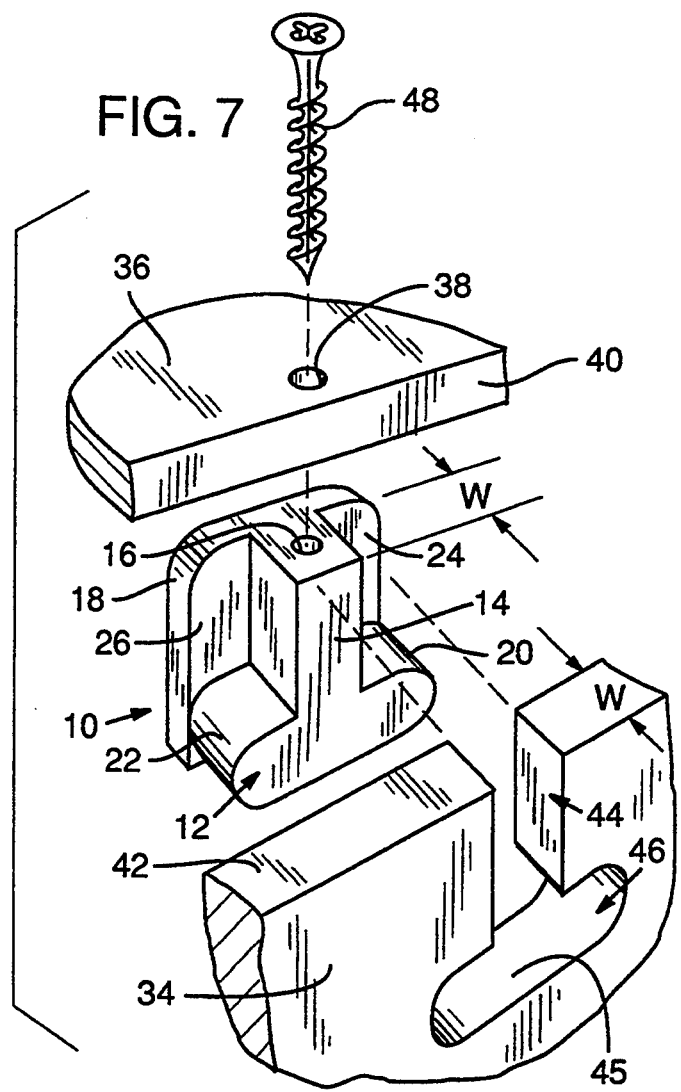

CONNECTOR AND METHOD FOR EDGE-TO-EDGE ASSEMBLY OF PRESSBOARD TO FORM FURNITURE STRUCTURES

This application is a continuation-in-part of copending U.S. design patent application Ser. No. 29/003,926, filed Jan. 21, 1993 now U.S. Pat. No. Des. 345,580 issued Mar. 29, 1994.

BACKGROUND OF THE INVENTION

This invention relates generally to methods of connecting one piece of material to another and more particularly to connecting adjacent sheets of pressboard in an abutting manner.

The construction of furniture typically requires one or more pieces of material to be fastened together. There are a variety of connectors and associated methods of attaching adjacent sheets. For example, adjacent sheets can be connected by screws, nails, dowels, or a host of other means.

These methods work well for most materials. Composite materials, however, present unique problems not adequately addressed by conventional attachment methods. Common types of composite materials are pressboard and plywood. These composite materials are the material of choice for low-cost furniture because the materials are made from scraps of wood resulting in low materials cost.

The scraps are "pressed" together under pressure to form the composite material. Although the composite material provides sufficient structural integrity to act as furniture, conventional methods for connecting adjacent sheets can cause the material to split and fracture. For example, connecting a top sheet of pressboard to a bottom sheet of pressboard to form a 90 degree abutting joint by driving a nail or screw through the top sheet into an edge of the bottom sheet can cause the sides of the bottom sheet to fracture. Driving pilot holes into the edge of the bottom sheet helps to alleviate this problem but the bottom sheet is weakened in the process.

Accordingly, a need remains for a method for connecting two adjacent sheets of material in an abutting manner which does not cause the material to fracture or split but yet preserves the structural integrity of the material.

SUMMARY OF THE INVENTION

It is, therefore, an object of the invention to connect two adjacent sheets of composite material in an abutting manner which does not cause the material to split.

Another object of the invention is to attach adjacent sheets of composite material while maintaining the structural integrity of the material.

A further object of the invention is to construct a furniture piece, e.g., a cockpit for a flight simulator, using the innovative technique.

A connector is used, according to the inventive principle, to abut two sheets of thin pressboard sheets. The connector includes a horizontal channel member and a vertical channel member connected to the horizontal channel member. The vertical member has a lengthwise hole formed therein for receiving a screw. The vertical channel member is connected at a midpoint of the horizontal channel member such that the vertical channel member and the horizontal channel member form a T-shape protrusion. The vertical and the horizontal channel member are attached to a backplate which circumscribes the members.

The connector is used to attach first and second sheets of material by forming T-shaped channel in the edge of the second and inserting a connector into each channel. A hole formed in the first sheet is positioned over the hole in the connector and a screw is driven through both holes to firmly attach the first sheet to the second sheet.

An advantage of the invention is that the connectors have a backplate that assists in aligning the connector with the top sheet to minimize the manufacturing time.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a perspective view of a connector.

FIG. 2 is a perspective view of the connector.

FIG. 3 is an elevation view of the front side of the connector.

FIG. 4 is an elevation view of the back side of the connector.

FIG. 5 is a cross-sectional view taken about lines 5—5 in FIG. 3.

FIG. 6 is a cross-sectional view taken about lines 6—6 in FIG. 3.

FIG. 7 is a perspective view of the connector being used into operation to connect two adjacent sheets of composite material.

FIG. 8 is a perspective view of the connector connecting the two adjacent sheets of composite material.

DETAILED DESCRIPTION

Figure 9:
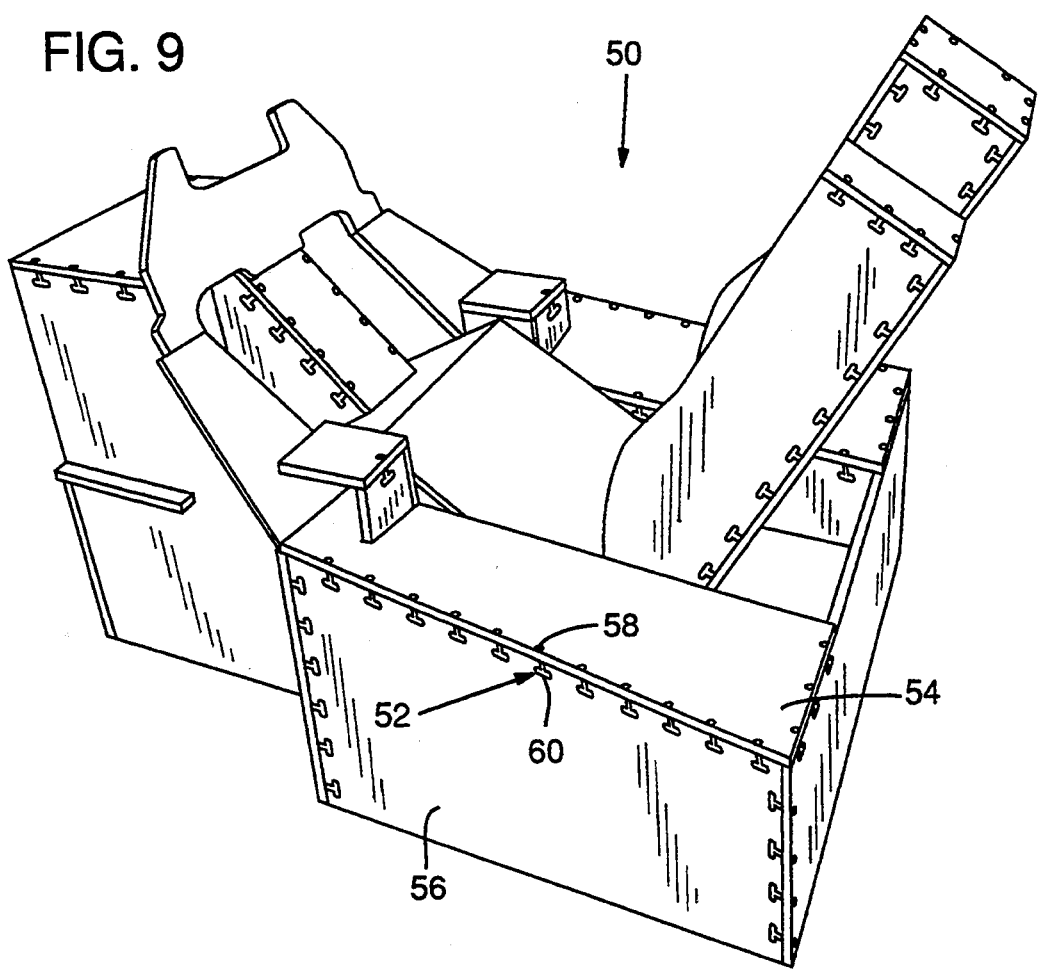
FIG. 9 is a perspective view of a flight simulator cockpit constructed using the inventive method.

A connector 10 for abutting two sheets of thin pressboard sheets is shown in FIGS. 1 and 2. The connector 10 includes a horizontal channel member 12. Connected at a midpoint of the horizontal channel member 12 is a vertical channel member 14. Taken together the horizontal and vertical members form an inverted "T" shaped protrusion. The vertical member 14 has a lengthwise hole 16 formed therein for receiving a screw. The length of the hole 16 is determined by the thickness of the pressboard sheets and the length of the screw being used, described further below. The hole 16, in the preferred embodiment, extends the entire length of the vertical member 14.

In the preferred embodiment, the vertical channel member 14 has a rectangular cross section taken lengthwise and a square cross section taken widthwise. The horizontal member 12 has semicircular lobes 20 and 22 formed at first and second ends. Alternatively, the lobes can be made into any variety of shapes as long as they protrude beyond the vertical member. The vertical member 14 and the horizontal member 12 are attached to a backplate 18. The backplate 18 is rectangular and circumscribes the horizontal and vertical channel members. The backplate 18 forms flanges 24 and 26 which provide help to retain the connector 10 in an engaged position. The flanges 24 and 26 operate as stops which prevent the connector from being slid all the way through an opening, as described further below.

In the preferred embodiment, the vertical channel member 14, the horizontal channel member 12, and the backplate 18 are formed of plastic. Excess plastic is removed from the connector along the backplate 18 and the horizontal member 12 to minimize the cost of the connector, which produces cavity 28, as shown in FIG. 1. The design of the cavity is shown more clearly in FIGS. 3 and 4.

Referring now to FIGS. 3 and 4, front and back elevation views of the connector 10 are shown. Hole 16 is shown in dashed lines extending lengthwise along the entire length of the vertical member 14. The other dashed lines primarily indicate the cavity 28. In the preferred embodiment, the cavity has sidewalls which are sloped to facilitate removal of the connector from a mold. Alternatively, the sidewalls of the cavity can be parallel to the respective members.

A cross section taken along lines 5—5 in FIG. 3 is shown in FIG. 5. The cross section shows sloping sidewalls 30 and 32 of the cavity 28 formed in a portion of the vertical member 14. Hole 16 is shown extending entire length of the vertical member 14. The connector 10 is shown relative to a first sheet of pressboard 34 when the connector is in the engaged position.

A cross section taken along lines 6—6 in FIG. 3 is shown in FIG. 6. The cross section shows the connector 10 inserted into the pressboard sheet 34, as described further below, and a second pressboard sheet 36 which is positioned in an abutting relationship with the first sheet 34. The second sheet has a hole 38 formed therein which is positioned directly atop hole 16 to allow a screw, not shown in FIG. 6, to be inserted through hole 38 and then through hole 16 to attach sheet 34 to sheet 36. The method of abutting two sheets is described fully below in the OPERATION section.

OPERATION

Referring now to FIGS. 7 and 8, first and second sheets of pressboard, 34 and 36, respectively, are shown. The description that follows assumes the use of pressboard, however, the invention is equally suitable for many other types of material, e.g., plywood.

Each sheet has a top and bottom sides and a perimeter edge. Sheets 34 and 36 have their respective reference numeral written on their respective top sides. Sheet 36 has a perimeter edge 40 and sheet 34 has perimeter edge 42.

Sheet 36 is attached to sheet 34 using the connector 10 by first boring hole 38 through the top and bottom sides of sheet 36 at a predetermined abutting position where sheet 34 is to attach to the sheet 36. A T-shaped channel 45 is formed in sheet 34 at a position opposite hole 38 when sheet 36 is in the desired abutting position. The T-shaped channel 45 has a vertical channel 44 extending away from the perimeter edge 42 approximately perpendicular thereto, and a horizontal channel 46 extending approximately parallel to the edge 42. The outer perimeter of the channel 45 is shaped to receive the vertical and horizontal members of the connector. In the preferred embodiment, the T-shaped channels are formed using a computerized router (not shown).

The connector 10 is inserted into channel 45 such that the connector frictionally engages with the channel. The width "W" of the vertical and horizontal members is approximately equal to the width of the sheet 34 so that when the connector fully extends into the channel, the top side of the channel members lie flush with the top side of sheet 34. Flanges 24 and 26 prevent the connector from pushing through to the other side of the sheet. This helps to align the connector with the hole 38 during assembly.

Next, the bottom side of sheet 36 is laid atop the perimeter edge of sheet 34 such that hole 38 of the sheet aligns with hole 16 of the connector. Screw 48 is inserting into hole 38 and tightened down using a screwdriver, thereby, abuttingly connecting the two sheets. The final assembly is shown in FIG. 8. This process is repeated along the perimeter edge 42 at spaced apart positions in order to fully secure sheet 36 to sheet 34. Although the perimeter edge of sheet 36 is coplanar with the front side of sheet 34, the inventive principle can be used to attach sheet 34 anywhere along the bottom side of sheet 36.

Figure 10:
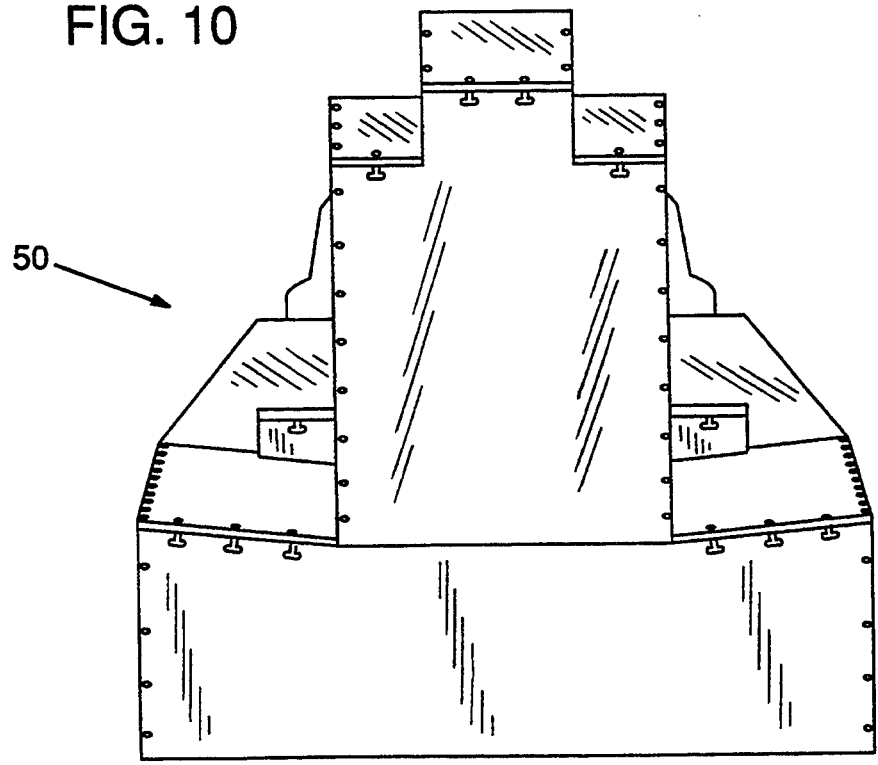
FIG. 10 is an elevation view of the back side of the flight simulator cockpit.

An example of a piece of furniture using only the inventive technique for assembly is shown in FIGS. 9 and 10. FIGS. 9 and 10 show a video flight simulator cockpit design 50 using only the connectors and screws described hereinabove. A typical connection pair is indicated generally at 52.

The cockpit includes a plurality of wood sheets. Each sheet is sized and arranged in a predetermined manner to form the desired structure. Adjacent sheets are arranged as first and second sheets such that the bottom side of the first sheet is positioned on the perimeter edge of the second sheet to form an abutting relationship. For example, sheet 54 can be considered a first sheet and sheet 56 can be considered a second sheet. The first sheet 54 has holes bored through the top and bottom sides, e.g., 58, at predetermined positions where the first sheet 54 is to attach to the second sheet 56.

The second sheet 56 has a T-shaped channel, e.g., 60, corresponding to each of the holes in the first sheet formed in the edge of the second sheet. A connector (not shown in FIGS. 9 and 10) is frictionally engaged in each channel. In the preferred embodiment, the backplate abuts the backside of the second sheet so as not to be visible upon inspection. A screw is then inserted through a hole in the first sheet which extends through a hole in the corresponding connector to abuttingly connect the first sheet to the second sheet. This process is repeated for all of the hole/connector pairs to form the final assembled cockpit 45.

Having described and illustrated the principles of the invention in a preferred embodiment thereof, it should be apparent that the invention can be modified in arrangement and detail without departing from such principles. I claim all modifications and variation coming within the spirit and scope of the following claims:

1. A connector for abutting and interconnecting two sheets of wood or pressboard comprising:
    a horizontal channel member having a front side and a back side;
    a vertical channel member connected at a first end to the horizontal channel member and having a front side and a back side and having a lengthwise hole formed in a second end for receiving a screw; and
    a backplate connected to the back side of the vertical channel member and the backside of the horizontal channel member.

2. A connector according to claim 1 wherein the vertical channel member is connected at a midpoint of the horizontal channel member such that the vertical channel member and the horizontal channel member form a T-shaped protrusion.

3. A connector according to claim 1 wherein the vertical channel member has a rectangular cross section taken lengthwise and a square cross section taken widthwise.

4. A connector according to claim 1 wherein the horizontal channel member has semicircular lobes formed at first and second ends.

5. A connector according to claim 1 wherein the backplate has a cavity formed therein which extends into the horizontal channel member and a portion of the vertical channel member to remove excess material.

6. A connector according to claim 5 wherein the cavity has sloped sidewalls to facilitate removal of the connector from a mold in which the connector is formed.

7. A connector according to claim 1 wherein the backplate is rectangular and circumscribes the horizontal and vertical channel member.

8. A connector according to claim 1 wherein the vertical channel member, the horizontal channel member, and the backplate are formed of plastic.

9. A connector according to claim 1 wherein the vertical channel member has a width, as measured perpendicular to the lengthwise hole, equal to a thickness of the sheet.

* * * * *